United States Patent [19]

Brodersen

[11] 4,384,690
[45] May 24, 1983

[54] THRUST VECTOR CONTROL FOR LARGE DEFLECTION ANGLES

[75] Inventor: Rolf K. Brodersen, Orlando, Fla.

[73] Assignee: The United States of America as represented by the Secretary of the Navy, Washington, D.C.

[21] Appl. No.: 241,327

[22] Filed: Mar. 6, 1981

[51] Int. Cl.³ .............................................. F42B 15/18
[52] U.S. Cl. ................................ 244/3.22; 239/265.27
[58] Field of Search ...................... 244/3.1, 3.21, 3.22; 60/229, 263; 239/265.25, 265.27

[56] References Cited

U.S. PATENT DOCUMENTS

| | | | |
|---|---|---|---|
| 2,965,334 | 12/1960 | McCullough, Jr. et al. | 244/14 |
| 3,115,887 | 12/1963 | McCorkle | 244/3.22 |
| 3,255,971 | 6/1966 | Widell | 60/263 |
| 3,292,865 | 12/1966 | Short et al. | 239/265.25 |
| 3,478,965 | 11/1969 | Llewellyn | 239/265.25 |
| 3,502,288 | 3/1970 | Pavlin et al. | 244/73 |
| 3,599,899 | 8/1971 | McCullough | 244/3.22 |
| 3,726,496 | 4/1973 | Leonard | 244/3.22 |
| 3,944,172 | 3/1976 | Becker | 244/169 |
| 4,017,040 | 4/1977 | Dillinger et al. | 244/3.22 |

Primary Examiner—Stephen C. Bentley
Assistant Examiner—Maureen Ryan
Attorney, Agent, or Firm—Richard S. Sciascia; Harvey A. David

[57] ABSTRACT

A missile thrust vector control system using fixed valves and nozzles in even numbers, as 4 or 8, mounted so that the thrust vectors operate at preselected angles to the frame and are pulse modulated in certain combinations to produce thrust vectors the sums of which provide desired deflections in pitch, yaw, and roll, without altering axial propulsion thrust.

2 Claims, 6 Drawing Figures

THRUST VECTOR CONTROL FOR LARGE DEFLECTION ANGLES

BACKGROUND OF THE INVENTION

This invention relates to the field of rocket propulsion, and more particularly steering of rocket propelled missiles or vehicles by thrust vector control.

Thrust vector control with large deflection angles (±20° and more) has, in the past, required the use of gimballed rocket motors or gimballed nozzles with the associated complexity of gimbal servos and related precision mechanisms that are exposed to large forces. The use of secondary injection of fluids such as liquids or cold or hot gas generally limits the thrust vector control deflection angle to approximately ±6°.

There has therefore existed an unfulfilled need for a thrust vector control system that can operate reliably, rapidly and effectively to produce not only a relatively constant axial thrust, but also thrust vectors that yield the lateral forces necessary for desired pitch, yaw and roll maneuvers without the complex mechanization associated with the gimballed systems. In answering that need, an additional and important consideration is a need for compatability with propulsion gas generators of the constant burn rate type. Such compatability requires a substantially constant level of total utilization of the gas generator output irrespective of modulation or apportionment between different thruster nozzles during various maneuvers.

SUMMARY OF THE INVENTION

With the foregoing in mind, it is a principal object of this invention to provide an improved thrust vector control system for propulsion and steering of missiles or vehicles.

Another object of the invention is to provide a thrust vector control system that functions to provide thrust at large angles while avoiding the need for gimballed rocket motors, nozzles, or other thruster elements and their associated mechanizations.

Yet another object is the provision of a thrust vector control system that is compatible with constant burn rate thrust gas generators.

Still another object is to provide a missile or vehicle propulsion system having thrust vector control through a combination of thrusters disposed at fixed predetermined angles relative to the vehicle frame of reference and operable by pulse duration modulation to achieve substantially constant axial thrust even while performing one or more maneuvers involving lateral thrust components.

As another object the invention aims to accomplish the foregoing while providing a system that is relatively simple and reliable in use.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
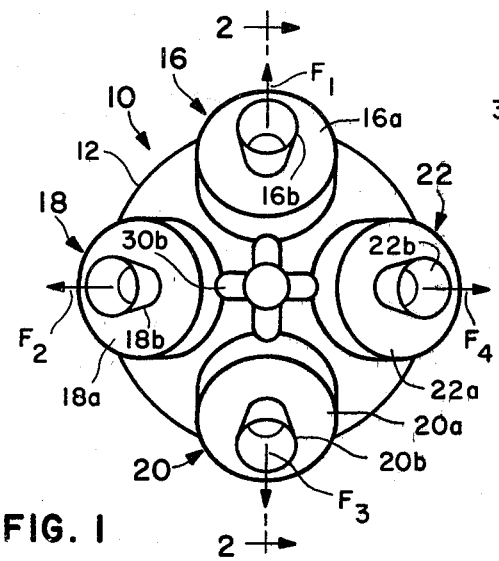
FIG. 1 is an end elevational view of a missile or vehicle including a thrust vector control system embodying this invention.
Figure 2:
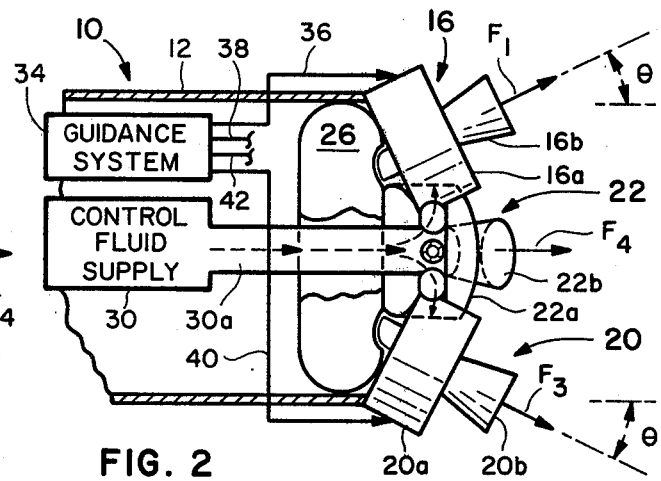
FIG. 2 is a fragmentary sectional view of the missile or vehicle of FIG. 1, taken substantially along line 2—2 thereof.

Referring to FIGS. 1 and 2, a missile or other vehicle 10 having an elongated, generally cylindrical body 12 is provided with a reaction generating thruster system at its after end, which system embodies thrust vector control according to this invention. In the form of the invention being described as an example, there are provided four thruster units generally indicated at 16, 18, 20, and 22, the units comprising valves 16a, 18a, 20a, and 22a, and associated thrust nozzles 16b, 18b, 20b, and 22b, respectively.

While the invention contemplates the use of any thrust gas controlling valve having the ability to interrupt and reestablish a full flow of thrust gas with considerable rapidity so as to provide a controllably pulsed output. The actual construction of such valves is not necessary to an understanding of this invention and so will not be described in detail. Suffice it to say here that valves of the type known in the art as vortex valves, which incorporate poppet valves, spool valves, or fluidic devices operated by high pressure control fluid, are suitable.

The thruster units 16–22 are disposed so as to diverge at predetermined angles $\theta$ to the frame of reference of the vehicle. These angles $\theta$, in this example, lie in planes passing through the central axis of the vehicle, are equal in magnitude, and can be large, e.g., 20°, or more. The thruster units 16–22 are supplied with thrust producing warm gas by a toroidal, gas generator 26 having passage means communicating with the vortex valves 16a–22a. The thrust gas generator 26 is capable of providing a substantially constant total mass-flow-rate.

High pressure control fluid is provided by a centrally located high pressure gas generator 30 connected by a conduit 30a and manifolding 30b to the poppet, spool valves, or fluidic elements of the vortex valves 16a–22a. A guidance system 34, using any well known navigational technique, provides control signals, represented by flow lines 36, 38, 40, 42, to the vortex valves 16a–22a, respectively.

MODE OF OPERATION

The signals, lines 36–42 regulate the duty cycles of the respective vortex valves by pulse duration modulation in a manner to provide not only continuous thrust for effecting forward motion of the vehicle 10, but also resultant thrust vector control for effecting pitch and yaw in accordance with the interest of the guidance system.

Figure 3:
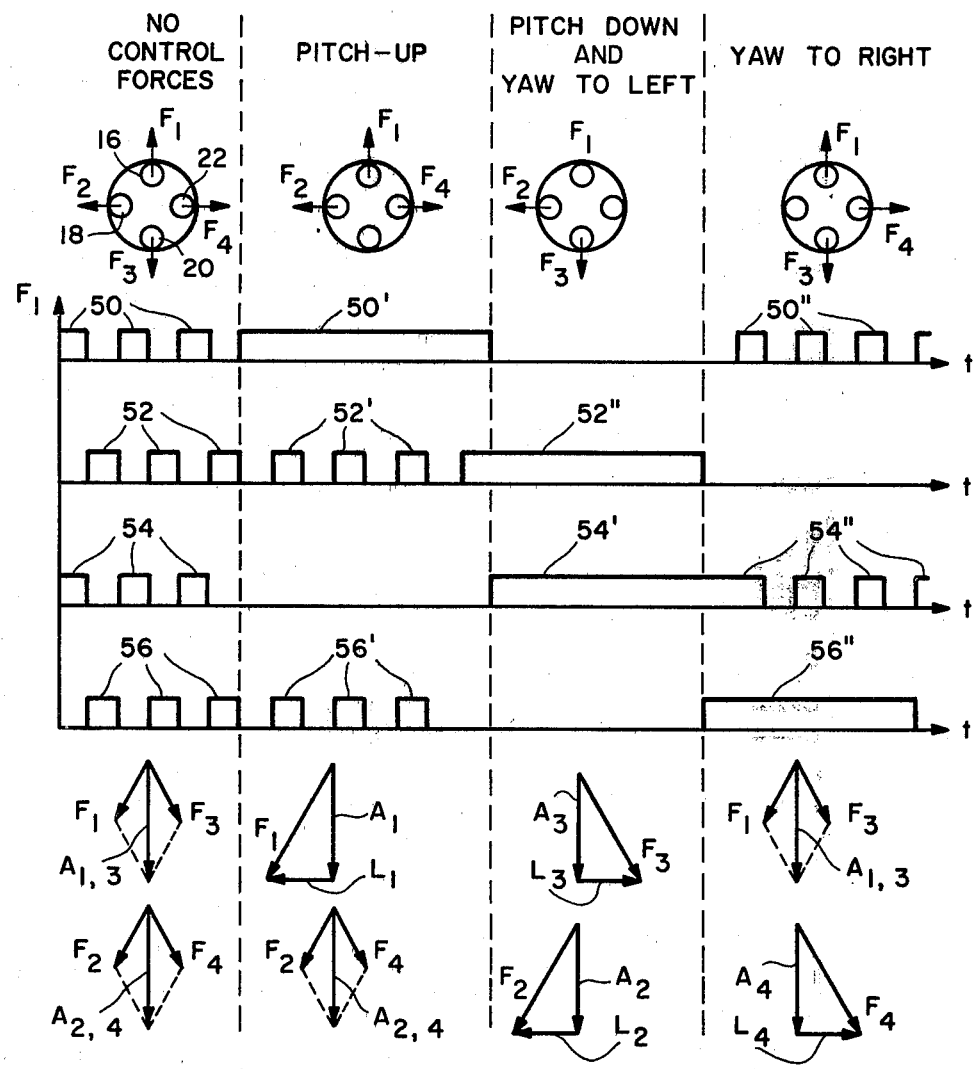
FIG. 3 is a tabular graphic illustration of various control modes of the system of FIGS. 1 and 2.

To this end, and with reference additionally to FIG. 3, the respective vortex valve controlled thrustors 16, 18, 20, and 22 are individually controlled in pulse duration modulation, with the thrust vectors $F_1$, $F_2$, $F_3$, and $F_4$ corresponding to the average thrust forces generated by the corresponding thrusters.

Beginning at the left in FIG. 3, the first example depicts normal operation with no control forces. In that case, all thrusters are pulsed at 50% duty cycle. Thus, the thrusters 16, 18, 20, and 22 provide thrust pulses 50, 52, 54, and 56, respectively. These pulses are at a frequency that minimizes vibration. Preferably, opposite thrusters are pulsed in synchronism and alternate with pulses of the adjacent thrusters. The net result is that lateral components of the thrust vectors $F_1$ and $F_3$ and of vectors $F_2$ and $F_4$ cancel to produce a zero lateral resultant, while the axial components of $F_1$ and $F_3$ add to provide a resultant axial thrust vector $A_{1,3}$ and the axial components of $F_2$ and $F_4$ add to provide a resultant axial thrust vector $A_{2,4}$.

In the next example, where a pitch-up maneuver is effected, the operation of the opposite thrusters 16,20 is altered to provide a continuous or prolonged pulse of the thruster 16 as shown at 50' while the thruster 20 is shut off completely. The opposite thrusters 18,22 continue to be simultaneously pulsed at the 50% duty cycle of each as indicated at 52' and 56'.

Again, the lateral components of the thrust vectors $F_2$ and $F_4$ of the thruster pair 18,22 are cancelled. However, the sideways or lateral component of the vector $F_1$ of the one operating thruster 16 is not cancelled and is indicated at $L_1$. The axial component of the thrust vector $F_1$ is indicated at $A_1$ in this example and, because the thruster 16 is operating at 100% of its duty cycle during the maneuver, $F_1$ is increased and $A_1$ is equal to the axial component $A_{2,4}$, as well as to the former combined axial components $A_{1,3}$ of the thrusters 16,20 of the former example. It will be recognized that the total axial thrust remains unchanged during the pitch-up maneuver. Also, that the total thrust gas flow remains unchanged. The latter is important in that it permits use of the mentioned constant rate thrust gas generator 26. It will also be recognized that the reaction of the vehicle is in movement of the aft end in the opposite directions to the thrust vectors or components being discussed.

Turning to the next example, a pitch down and yaw to left maneuver is being executed. In this manuever, the thrusters 16 and 22 are shut down and the thrusters 18 and 20 are operated at 100% of their duty cycles as shown at 52" and 54', respectively. The resulting axial components $A_3$ and $A_2$ maintain the total axial thrust constant, while the lateral components $L_3$ and $L_2$ effect the desired vehicle maneuver.

The last example, a yaw to right involves normal 50% pulsing of the opposite thrusters 16, 20 as indicated at 50" and 54" and operation of the other opposing thrusters to provide a zero duty cycle by thrusters 18 and 100% duty cycle of thruster 22 as shown at 56". As before, the axial components remain constant. The lateral components, however, are cancelled for the thrusters 16, 20 as in the first example, and a lateral component $L_4$ of the vector $F_4$ exists that produces the desired yaw maneuver.

Figure 4:
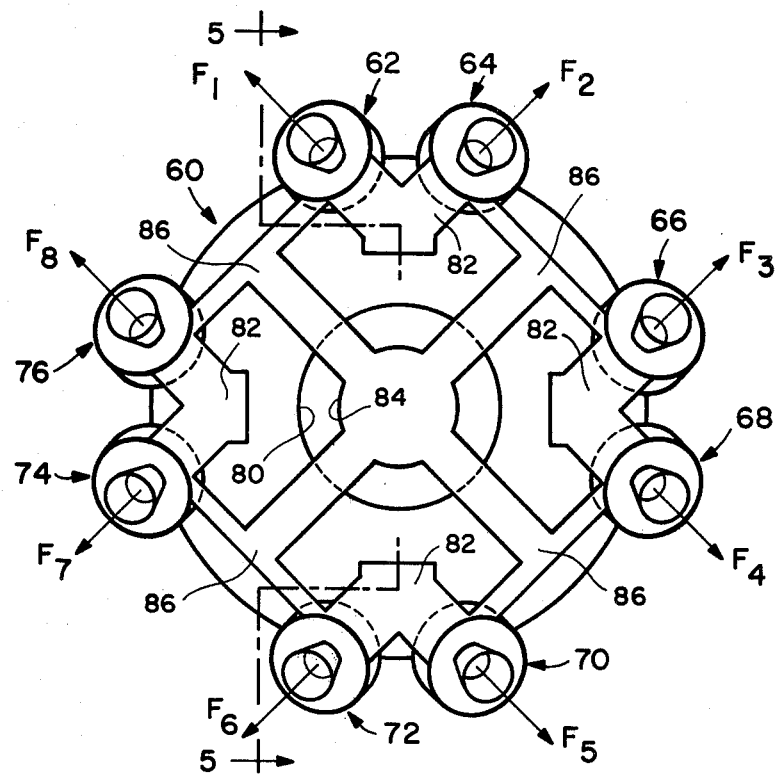
FIG. 4 is an end elevational view of a missile or vehicle including an alternative embodiment of the invention.
Figure 5:
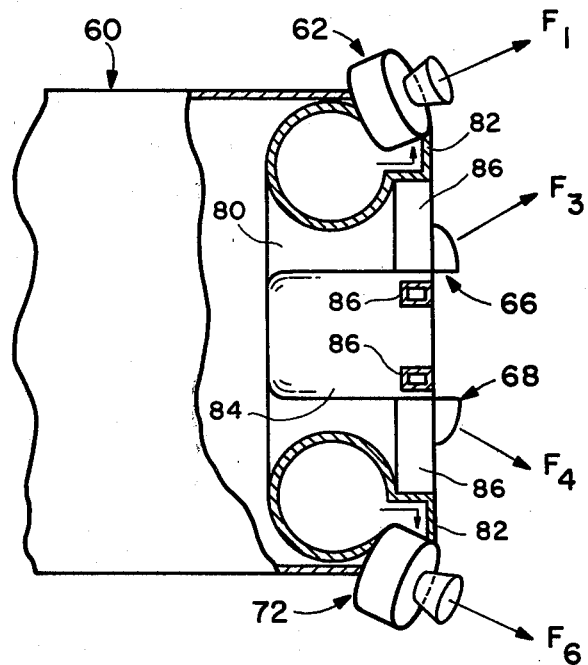
FIG. 5 is a fragmentary sectional view of the missile or vehicle of FIG. 4, taken substantially along line 5—5 thereof.

An alternative embodiment of the invention is illustrated in FIGS. 4 and 5, which embodiment permits thrust vector control to provide the additional controlled maneuver of roll in either direction about the axis of the vehicle. In this embodiment, a vehicle 60 is provided with eight thrusters 62,64, 66, 68, 70, 72, 74, and 76 each individually comprising and controlled by a vortex valve and including a suitable nozzle. These eight thrusters are disposed at fixed thrust angles relative to the vehicle frame of reference and are pulse duration modulated, for example between zero, 50% and 100% duty cycles, to accomplish the desired manuevers while maintaining a substantially constant average axial thrust and total gas mass-flow-rate.

As is best seen in FIG. 4, the eight thrusters are arranged in four pairs such that 62 and 64 constitute one pair, 70, 72 an opposite pair, while 66, 68 constitute a pair with 74,76 the opposite pair. It will be observed that opposite pairs are set at angles diverging to opposite sides of the vehicle and further that the thrusters of a given pair are canted or set at angles diverging to opposite sides of a plane extending between those thrusters and the thrusters of the opposite pair.

A supply of thrust producing warm gas is ducted to the four pairs of vortex valves of the four thruster pairs from a toroidal gas generator 80, via ducts 82. A supply of high pressure control fluid is provided to the eight vortex valves from a centrally located gas generator 84 via ducts 86. A guidance system, not shown, provides control signals to those valves to effect pulse duration modulation of the thrusters in accordance with the invention to implement maneuvers of pitch, yaw, and roll, or combinations thereof.

Figure 6:
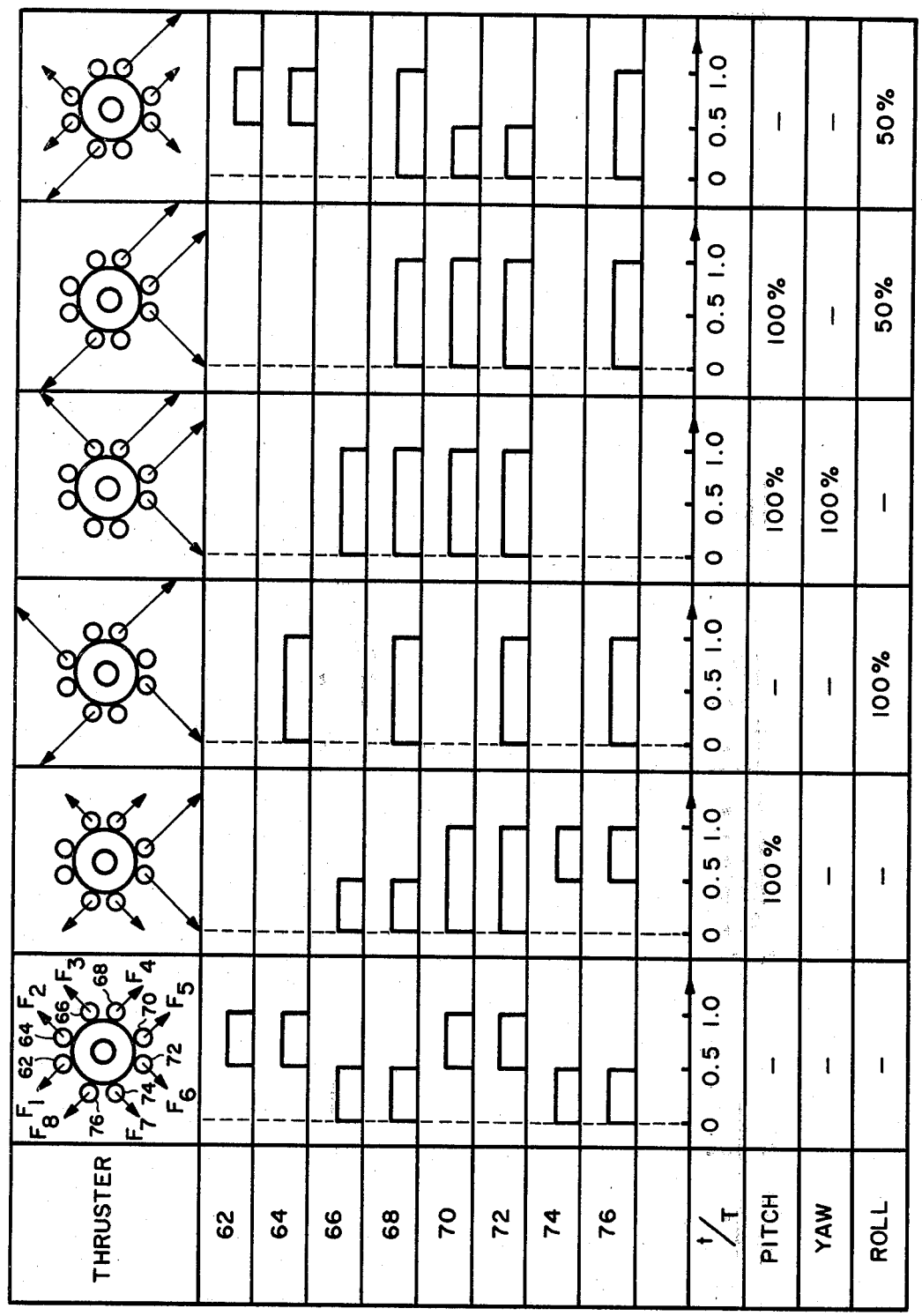
FIG. 6 is a tabular, graphic illustration of various control modes of the system of FIGS. 4 and 5.

Now, referring to the first or left hand control situation of FIG. 6, when all eight thrusters are pulsed between full off and full on at a 50% duty cycle no pitch, yaw, or roll is induced because all lateral components are cancelled. The total axial thrust will be the sum of the axial components of the eight thrust vectors $F_1$, $F_2,-F_8$. Inspection of FIG. 6 will further reveal the pulse modulation program for operation of the eight thruster valves to effect conditions of pitch, yaw, roll, and combinations thereof, all while maintaining substantially constant average mass-flow-rate and axial thrust.

Examples having been given of embodiments of the invention employing 4 and 8 thruster units, it will be understood to those skilled in the art, without further description, that the invention can readily be embodied in other even numbered configurations. Thus, the thruster units could be 2, 4, 6, 8 or more in number, wherein antipodal units or pairs are pulse duration modulated to produce the desired lateral thrust components while maintaining a constant total average axial thrust.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

I claim:

1. A thrust vector control system for effecting propulsion as well as selected maneuvering modes of a vehicle having a vehicular frame of reference including a principal axis, said vehicle including a substantially constant-rate thrust gas generator, said system comprising:
   first, second, third, and fourth thruster means mounted on said vehicle with said first and third thruster means and said second and fourth thruster means diametrically opposite one another;
   duct means for supplying thrust gas from said thrust gas generator to said thruster means;
   said thruster means comprising thrust gas valve means operative rapidly between full off and full on flow conditions and said thruster means being fixed at divergent angles relative to said frame of reference so as to generate pulses of thrust forces each having axial and lateral force components relative to said frame of reference;

guidance means for generating pulse duration modulated control signals corresponding to each of said valve means, said control signals being varied in accordance with changes in said maneuvering modes;

said thruster means being responsive to said control signals during absence of a maneuvering mode such that said first, second, third, and fourth thruster means each operate at substantially a 50% on time duty cycle, whereby said lateral force components all cancel and said axial force components combine to yield a total average axial thrust;

said thruster means being responsive to said control signals during a pitch maneuver such that said second and fourth thruster means each operate at 50% duty cycle and one of said first and third thruster means operates at 100% duty cycle while the other thereof operates at 0% duty cycle, said thruster means being responsive to said control signals during a yaw maneuver such that said first and third thruster means each operate at 50% duty cycle and one of said second and fourth thruster means operates at 100% duty cycle while the other thereof operates at 0% duty cycle, whereby two of said lateral force components cancel and two combine during a pitch maneuver or a yaw maneuver while said total average axial thrust remains substantially constant;

said first, second, third, and fourth thruster means being responsive to said control signals during a combined pitch and yaw maneuver such that two adjacent ones of said thruster means operate at 0% duty cycle while the other two adjacent ones of said thruster means operate at 100% duty cycle;

each of said first, second, third, and fourth thruster means comprising a pair of thruster units, the remote units of each adjacent pair being disposed at fixed angles lying in a common plane parallel to and displaced laterally to one side of the central axis of said vehicle, and the thruster units of antipodal ones of said pairs diverge to opposite sides of an axial plane extending therethrough; and said thruster units of said pairs being individually responsive to said control signals whereby prolonged thrust pulse operation of selected ones of the thruster units of said pairs and correspondingly reduced pulse operation of the others of the thruster units of said pairs provides roll producing moments on said vehicle, while maintaining constant said total average axial thrust.

2. The combination defined in claim 1, and wherein:

said valves are pulsed in response to said control signals at a pulse frequency when operated at said 50% duty cycle; and the thruster units of adjacent pairs being pulsed alternately when both are operated at said pulse frequency and thruster units of antipodal pairs being pulsed in synchronism when both are operated at said pulse frequency.

* * * * *